(12) United States Patent
Kaisare et al.

(10) Patent No.: US 9,022,161 B2
(45) Date of Patent: May 5, 2015

(54) VEHICLE BONNET STRUCTURE FOR PEDESTRIAN PROTECTION

(71) Applicants: Sudesh Kumar Kaisare, Maharashtra (IN); Suresh Raghunath Kale, Maharashtra (IN); Ritesh Kumar Jain, Maharashtra (IN)

(72) Inventors: Sudesh Kumar Kaisare, Maharashtra (IN); Suresh Raghunath Kale, Maharashtra (IN); Ritesh Kumar Jain, Maharashtra (IN)

(73) Assignee: Mahindra & Mahindra Limited, Maharashtra (IN)

( * ) Notice: Subject to any disclaimer, the term of this patent is extended or adjusted under 35 U.S.C. 154(b) by 0 days.

(21) Appl. No.: 14/018,061

(22) Filed: Sep. 4, 2013

(65) Prior Publication Data
US 2014/0138176 A1    May 22, 2014

Related U.S. Application Data

(63) Continuation of application No. 13/812,374, filed as application No. PCT/IN2011/000499 on Jul. 28, 2011.

(30) Foreign Application Priority Data

Jul. 27, 2010   (IN) .......................... 2131/MUM/2010

(51) Int. Cl.
*B60R 21/34* (2011.01)
*B62D 25/10* (2006.01)

(52) U.S. Cl.
CPC .............. *B62D 25/105* (2013.01); *B60R 21/34* (2013.01); *B60R 2021/343* (2013.01)

(58) Field of Classification Search
CPC . B60R 2021/343; B60R 21/34; B62D 25/105

USPC .......................... 180/274; 296/193.11, 187.04
See application file for complete search history.

(56) References Cited

U.S. PATENT DOCUMENTS

| | | | | |
|---|---|---|---|---|
| 6,048,022 | A * | 4/2000 | Ishibashi et al. | 296/187.09 |
| 7,090,289 | B2 * | 8/2006 | Koura | 296/193.11 |
| 7,988,222 | B2 * | 8/2011 | Fujimoto | 296/187.04 |
| 8,052,198 | B2 * | 11/2011 | Seksaria et al. | 296/187.04 |
| 8,424,629 | B2 * | 4/2013 | Ralston et al. | 180/274 |
| 8,465,087 | B2 * | 6/2013 | Gerwolls et al. | 296/187.05 |
| 8,845,012 | B2 * | 9/2014 | Sekikawa et al. | 296/193.11 |
| 2004/0178662 | A1 * | 9/2004 | Carroll et al. | 296/187.03 |
| 2006/0006698 | A1 * | 1/2006 | Ishikawa et al. | 296/193.11 |
| 2010/0140979 | A1 * | 6/2010 | Seksaria et al. | 296/193.11 |
| 2013/0015682 | A1 * | 1/2013 | Ikeda et al. | 296/187.04 |
| 2013/0241241 | A1 * | 9/2013 | Sekikawa et al. | 296/193.11 |
| 2014/0138176 | A1 * | 5/2014 | Kaisare et al. | 180/274 |

FOREIGN PATENT DOCUMENTS

| | | | | |
|---|---|---|---|---|
| DE | 10063586 | | 8/2002 | |
| DE | 102004061303 | | 8/2005 | |
| DE | 102004061303 | A1 * | 8/2005 | ............. B62D 25/10 |
| EP | 1707452 | | 10/2006 | |
| FR | 2621677 | | 4/1989 | |
| JP | 2003054449 | | 2/2003 | |

* cited by examiner

*Primary Examiner* — Karen Beck
(74) *Attorney, Agent, or Firm* — Cozen O'Connor

(57) ABSTRACT

A vehicle bonnet structure for pedestrian protection. The vehicle bonnet has outer panel between front end and wind shield of vehicle. An inner panel disposed and secured along the entire region of a reverse surface of the outer panel. A plurality of semi-spherical configurations having plurality of cuts on the periphery are provided on the inner panel of the bonnet. A bead is provided on the top of each of the semi-spherical structures. The semi-spherical structure with bead accommodated between the inner panel and outer panel.

11 Claims, 3 Drawing Sheets

VEHICLE BONNET STRUCTURE FOR PEDESTRIAN PROTECTION

CROSS REFERENCE TO RELATED APPLICATIONS

This application is a continuation of U.S. patent application Ser. No. 13/812,374 which was filed with the U.S. Patent and Trademark Office on Jan. 25, 2013 which is a U.S. national stage of application No. PCT/IN2011/000499, filed on Jul. 28, 2011. Priority is claimed for this invention and corresponding application No. 2131/MUM/2010 having been filed in India on Jul. 27, 2010.

BACKGROUND OF THE INVENTION

1. Field of the Invention

The present invention is related to vehicle bonnet structure. More particularly the present invention is related to bonnet structure having deformable head impact zone and used in automobile vehicle and like other vehicles that protects the pedestrian at the time of impact.

2. Description of the Related Art

Most of the vehicle bonnets include a generally planar or curvilinear outer skin which is joined to a series of reinforcing ribs provided by a stamped metallic sheet of material. During vehicle and pedestrian collision, it is observed that the pedestrian is seriously injured due to the pedestrian's head striking the bonnet of the vehicle. To keep the risk of injury as low as possible, controlled resilience in the head impact region of the bonnet is required. The present invention addresses this problem and provides the novel bonnet structure that will protect the pedestrian in case of pedestrian impact by absorbing the impact energy.

SUMMARY OF THE INVENTION

The main objective of the present invention is to provide vehicle bonnet structure for pedestrian protection.

Another objective of the present invention is to provide vehicle bonnet structure with semi-spherical bulbs having a definite cut outs for pedestrian protection.

Another objective of the present invention is to provide vehicle bonnet structure for pedestrian protection wherein head impact energy is absorbed by the semi-spherical structures by undergoing deformation.

Accordingly the invention provides the vehicle bonnet structure for pedestrian protection comprises outer panel between front end and wind shield of vehicle; an inner panel disposed and secured along the entire region of a reverse surface of the said outer panel; the plurality of Semi-spherical configurations; each semi-spherical configuration having the plurality of cuts on the periphery are provided on the inner panel of the bonnet; a bead is provided on the top of each of the said semispherical structure; the said semi-spherical structure with bead accommodated between said inner panel and outer panel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will become more fully understood from the following detailed description, taken in conjunction with the accompanying drawings, wherein.

DETAILED DESCRIPTION OF THE PRESENTLY PREFERRED EMBODIMENTS

Figure 1:
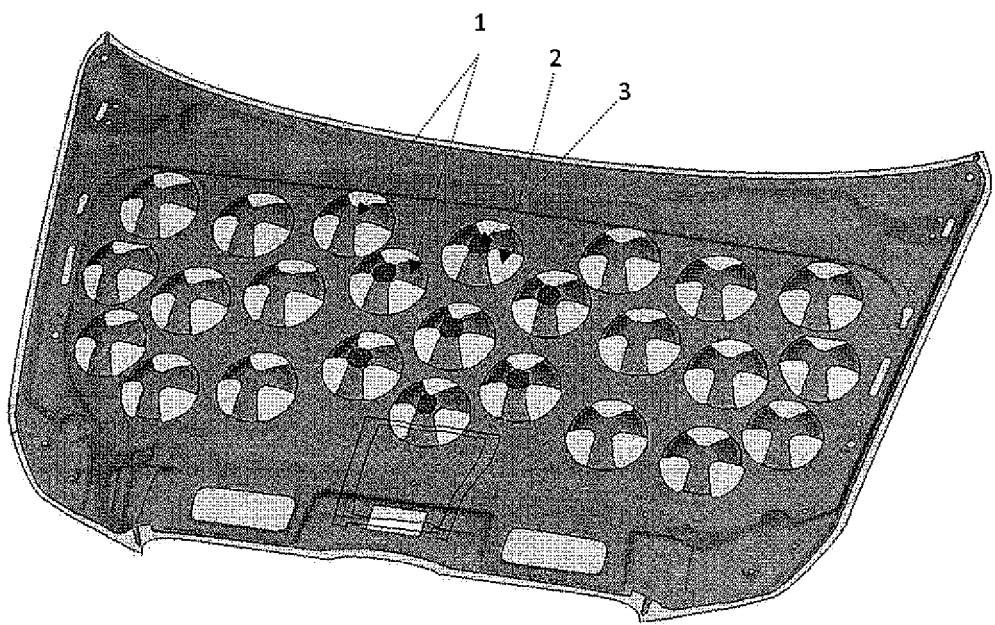
FIG. 1 shows isometric view of panel of a bonnet structure in accordance with the present invention.

The vehicle bonnet structure is located between the front end and a windshield of a vehicle. The vehicle bonnet structure comprises of an outer panel structuring a vehicle body outer side surface, an inner panel disposed along the entire region of a reverse surface of the bonnet outer panel and secured to the outer panel. Semi-spherical configurations (1) with specially made cuts (2) are provided on the inner panel of the bonnet as disclosed in FIG. 1. Each semi-spherical structure is provided with the bead (3) on the top of the semi-spherical structure (1). The semi-spherical structures (1) with cut outs (2) provides the flexibility of changing the stiffness as required for the head impact at particular location by changing the cutout size, thickness, sphere diameter and by adding bead on the sphere. The semi-spherical structures with cut outs are accommodated in between the space between inner panel and outer panel of the bonnet and outer panel of the bonnet rests on the beads of the semi-spherical structure. The semi-spherical structure is provided with plurality of cuts along its periphery.

Figure 2:
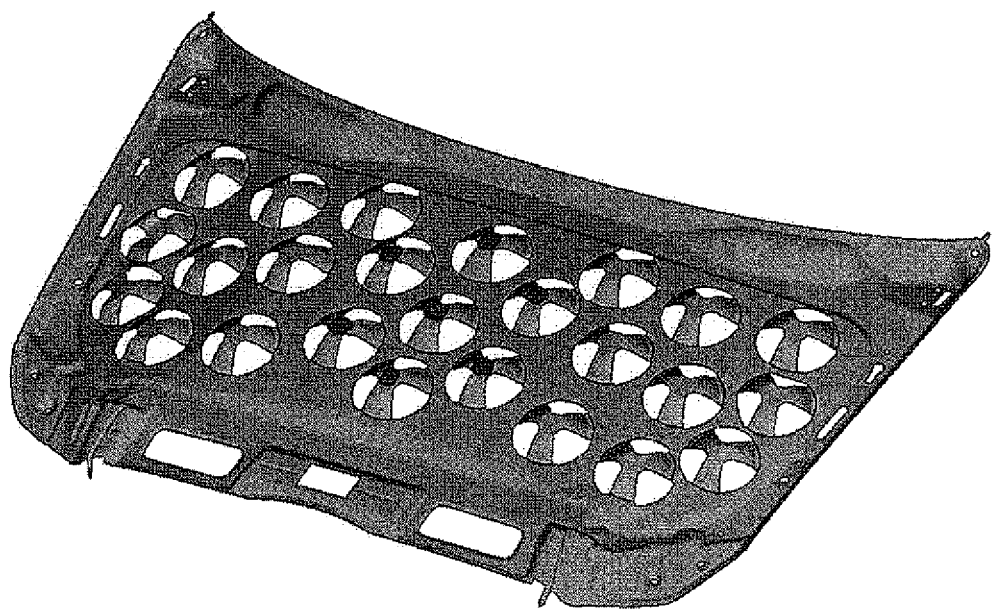
FIG. 2 shows bonnet structure wherein semi-spherical projections on the panel are deformed due to the head impact.

In case of pedestrian impact on the outer panel of the bonnet, the semi-spherical structure on the inner panel absorbs the impact energy and undergoes deformation as shown in FIG. 2; thus protecting the pedestrian from serious injury.

Figure 3:
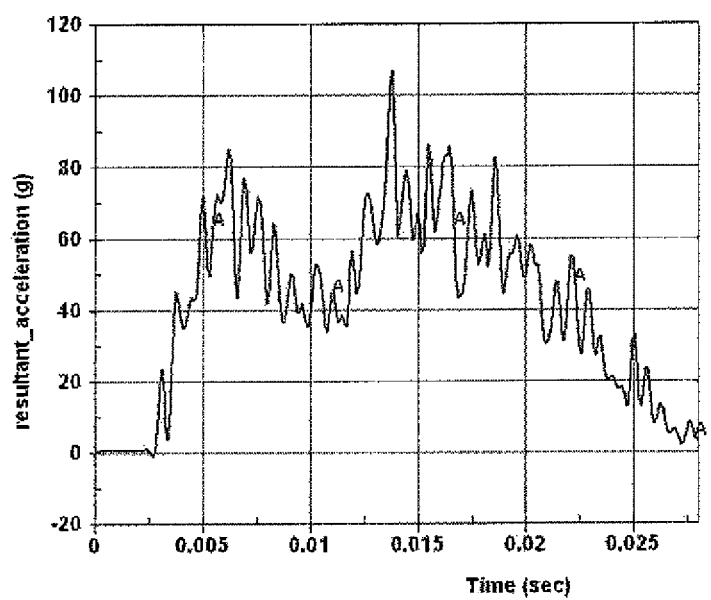
FIG. 3 shows acceleration versus time plot and HIC criteria of a location hood.

Head impact criteria (HIC), sometimes called as head performance criteria, is measured by a spherical like object simulating the pedestrian head is impacted with the bonnet. The spherical object has an accelerometer mounted therein and HIC is calculated from the resultant of accelerometer time histories. Because of this semi-spherical structure on the inner panel of the bonnet HIC value is reduced too much below the permissible limit as shown in FIG. 3. This design can be adopted for different vehicle engine layout by altering the stiffness. This design gives the flexibility of changing the stiffness as required for the head impact at particular location by changing the cutout size, thickness, sphere diameter and by adding bead on the sphere.

The bonnet structure for automotive vehicle as disclosed herein can be made in plastic or metal sheets or combination of thereof. Also the inner panel of the bonnet can be made of metal sheet and the semi-spherical, structure can be made of suitable grade of plastic. The impact absorbing semi-spherical structures can be the add-on kind of fittings to the inner panel of the bonnet. The bonnet inner panel with semi-spherical structures can be made by forming to get an integrated inner panel. In case of modular inner panel the semi-spherical structures can be attached to the inner panel by clinching and/or riveting processes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A vehicle bonnet structure for pedestrian protection, comprising:
    an outer panel between a front end and a wind shield of vehicle;
    an inner panel disposed and secured along the entire region of a reverse surface of the outer panel;
    a plurality of semi-spherical structures having a plurality of cuts on the periphery on the inner panel of the bonnet; and
    a bead on the top of one or more of the semispherical structures, wherein the semi-spherical structures with bead are accommodated between the inner panel and the outer panel.

2. The vehicle bonnet structure as claimed in claim 1, wherein the said bonnet structure comprises one or more plastic or metal sheets.

3. The vehicle bonnet structure as claimed in claim 1, wherein the inner panel of the bonnet comprises metal sheet and the semi-spherical structure comprises a suitable grade of plastic for fulfilling a requirement to absorb a head impact.

4. The vehicle bonnet structure as claimed in claim 1, wherein a cutout size, a thickness, a sphere diameter and an addition of a bead on a sphere on a semispherical structure of the one or more semi-spherical structures are based on a required stiffness to accommodate a potential head impact at a particular location.

5. The vehicle bonnet structure as claimed in claim 1, wherein the bonnet inner panel with semi-spherical structures is made by a forming process to obtain an integrated inner panel.

6. The vehicle bonnet structure as claimed in claim 1, wherein the semi-spherical structures are attached to the inner panel by clinching and/or riveting processes.

7. The vehicle bonnet structure as claimed in claim 1, wherein the semi-spherical structures comprise add-on fittings to the inner panel of the bonnet.

8. The vehicle bonnet structure as claimed in claim 2, wherein the inner panel of the bonnet comprises metal sheet and the semi-spherical structure is comprises a suitable grade of plastic for fulfilling a requirement to absorb head impact.

9. The vehicle bonnet structure as claimed in claim 3, wherein a cutout size, a thickness, a sphere diameter and an addition of a bead on a sphere on a semispherical structure of the one or more semi-spherical structures are based on a required stiffness to accommodate a potential head impact at a particular location.

10. The vehicle bonnet structure as claimed in claim 4, wherein the bonnet inner panel with semi-spherical structures is made by a forming process to obtain an integrated inner panel.

11. The vehicle bonnet structure as claimed in claim 6, wherein the semi-spherical structures comprise add-on fittings to the inner panel of the bonnet.

\* \* \* \* \*